United States Patent
Ghanwani

(10) Patent No.: US 10,805,223 B1
(45) Date of Patent: Oct. 13, 2020

(54) SYSTEMS AND METHODS FOR HANDLING DATA CONGESTION FOR SHARED BUFFER SWITCHES WITH DYNAMIC THRESHOLDING

(71) Applicant: DELL PRODUCTS L.P., Round Rock, TX (US)

(72) Inventor: Anoop Ghanwani, Roseville, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/380,792

(22) Filed: Apr. 10, 2019

(51) Int. Cl.
| | | |
|---|---|---|
| H04L 12/823 | (2013.01) | |
| H04L 12/835 | (2013.01) | |
| H04L 12/873 | (2013.01) | |
| H04L 12/801 | (2013.01) | |

(52) U.S. Cl.
CPC ............ H04L 47/326 (2013.01); H04L 47/11 (2013.01); H04L 47/30 (2013.01); H04L 47/522 (2013.01)

(58) Field of Classification Search
CPC ......... H04L 47/11; H04L 47/30; H04L 47/326
See application file for complete search history.

(56) References Cited

U.S. PATENT DOCUMENTS

| | | | | |
|---|---|---|---|---|
| 6,463,068 B1* | 10/2002 | Lin | .......................... | H04L 45/00 370/230 |
| 6,510,160 B1* | 1/2003 | Nikuie | ............... | H04Q 11/0478 370/232 |
| 6,538,989 B1* | 3/2003 | Carter | ................... | H04L 47/521 370/229 |
| 6,671,258 B1* | 12/2003 | Bonneau | ............. | H04L 12/5602 370/235 |
| 6,839,321 B1* | 1/2005 | Chiruvolu | ........... | H04L 12/5602 370/230.1 |
| 6,961,307 B1* | 11/2005 | Aweya | ..................... | H04L 47/10 370/230 |
| 7,324,535 B1* | 1/2008 | Goss | ....................... | H04L 45/50 370/230 |

(Continued)

OTHER PUBLICATIONS

Vincent Rosolen et al.,"A RED discard strategy for ATM networks and its performance evaluation with TCP/IP traffic," In ACM SIGCOMM Computer Communication Review 29:23-43, Jul. 1999. (21pgs).

*Primary Examiner* — Melanie Jagannathan
(74) *Attorney, Agent, or Firm* — North Weber & Baugh LLP

(57) ABSTRACT

Embodiments of the present invention include systems and methods for adjusting RED configuration according to the available buffer space for a queue in a switch. In one or more embodiments, a method comprises the steps of: initializing minimum and maximum thresholds of RED associated with a queue; determining an available free space for the queue, wherein a data packet for the queue is discarded by a dynamic thresholding when a length of the queue reaches the available free space; determining an allowable free space (AFS) for the queue that is a multiplication of the available free space to an allowance factor (AF); and, when the length of the queue reaches the AFS, calculating a ratio of the minimum threshold to the maximum threshold and updating the maximum threshold to the AFS and updating the minimum threshold to a multiplication of the ratio to the AFS.

20 Claims, 7 Drawing Sheets

(56) References Cited

U.S. PATENT DOCUMENTS

| | | | | |
|---|---|---|---|---|
| 7,636,307 B2* | 12/2009 | Thibodeau | ............... | H04L 47/10 |
| | | | | 370/230.1 |
| 7,844,432 B1* | 11/2010 | Jones | ...................... | H04L 43/50 |
| | | | | 370/395.53 |
| 7,990,978 B1* | 8/2011 | Chamas | ................ | H04L 47/525 |
| | | | | 370/395.21 |
| 8,078,763 B1* | 12/2011 | Boddu | ................ | H04L 12/1881 |
| | | | | 370/412 |
| 9,286,215 B2* | 3/2016 | Yuasa | ..................... | G06F 12/08 |
| 2003/0214954 A1* | 11/2003 | Oldak | ..................... | H04L 47/12 |
| | | | | 370/400 |
| 2005/0015475 A1* | 1/2005 | Fujita | .................... | G06F 3/0631 |
| | | | | 709/223 |
| 2006/0164989 A1* | 7/2006 | Hart | ........................ | H04L 47/11 |
| | | | | 370/235 |
| 2006/0187945 A1* | 8/2006 | Andersen | ................ | H04L 47/50 |
| | | | | 370/412 |
| 2007/0002882 A1* | 1/2007 | Mansour | ................ | H04L 49/90 |
| | | | | 370/412 |
| 2012/0182870 A1* | 7/2012 | Francini | ................ | H04L 47/193 |
| | | | | 370/235 |
| 2016/0294696 A1* | 10/2016 | Gafni | ...................... | H04L 49/30 |
| 2017/0339062 A1* | 11/2017 | Mayer-Wolf | ........... | H04L 47/29 |
| 2018/0048575 A1* | 2/2018 | Mangin | ................... | H04L 47/22 |
| 2018/0174561 A1* | 6/2018 | Nariyama | ................ | G10H 1/40 |

* cited by examiner

| Max_th = 0.1 MB | |
|---|---|
| qlen | Prob (Discard/Mark) |
| <= 50 KB | 0.00 |
| 55 KB | 0.03 |
| 60 KB | 0.06 |
| 65 KB | 0.09 |
| 70 KB | 0.12 |
| 75 KB | 0.15 |
| 80 KB | 0.18 |
| 85 KB | 0.21 |
| 90 KB | 0.24 |
| 95 KB | 0.27 |
| 100 KB | 0.30 |
| > 100 KB | 1.00 |

Table 1

| Max_th = 0.8 MB | |
|---|---|
| qlen | Prob (Discard/Mark) |
| <= 400 KB | 0.00 |
| 440 KB | 0.03 |
| 480 KB | 0.06 |
| 520 KB | 0.09 |
| 560 KB | 0.12 |
| 600 KB | 0.15 |
| 640 KB | 0.18 |
| 680 KB | 0.21 |
| 720 KB | 0.24 |
| 760 KB | 0.27 |
| 800 KB | 0.30 |
| > 800 KB | 1.00 |

Table 8

| Max_th = 0.9 MB | |
|---|---|
| qlen | Prob (Discard/Mark) |
| <= 450 KB | 0.00 |
| 495 KB | 0.03 |
| 540 KB | 0.06 |
| 585 KB | 0.09 |
| 630 KB | 0.12 |
| 675 KB | 0.15 |
| 720 KB | 0.18 |
| 765 KB | 0.21 |
| 810 KB | 0.24 |
| 855 KB | 0.27 |
| 900 KB | 0.30 |
| > 900 KB | 1.00 |

Table 9

| Max_th = 1 MB | |
|---|---|
| qlen | Prob (Discard/Mark) |
| <= 500 KB | 0.00 |
| 550 KB | 0.03 |
| 600 KB | 0.06 |
| 650 KB | 0.09 |
| 700 KB | 0.12 |
| 750 KB | 0.15 |
| 800 KB | 0.18 |
| 850 KB | 0.21 |
| 900 KB | 0.24 |
| 950 KB | 0.27 |
| 1 MB | 0.30 |
| > 1 MB | 1.00 |

Table 10

FIG. 4

SYSTEMS AND METHODS FOR HANDLING DATA CONGESTION FOR SHARED BUFFER SWITCHES WITH DYNAMIC THRESHOLDING

A. TECHNICAL FIELD

The present invention relates to information handling systems; more particularly, to systems and methods for managing data queues in a shared buffer switch with an adjustable random early detection (RED) mechanism.

B. DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a conventional network switch, an active queue management technique, such as RED, having fixed parameters is used to discard data packets before the tail drop occurs in the switch. Also, the conventional data packet may include ECN bits for marking the data packets so as to signal congestion before a queue gets full. The conventional system handles the congestion in the queue using either a queue-level marking, a port-level marking or a pool-level marking, all with static thresholds. In a system using the queue-level marking approach, all of the data packets arriving at a queue may be marked if the total buffer used by the queue has more than a certain amount of occupancy. In a system using the port-level marking approach, all of the data packets arriving at any queue at a port may be marked if the total buffer used by all of the queues on that port has more than certain amount of occupancy. In a system using the pool-level marking approach, all of the data packets arriving at any queue that shares a pool may be marked if the total buffer occupancy by all of the queues sharing the pool exceeds a certain threshold. In the latter two approaches, the switch may mark packets going even to non-congested queues, and the existing solution is not color (classification) aware.

As such, there is a need for systems and methods that prevent marking packets too early when the switch is not congested.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

FIG. 4 depicts tables that correspond to an implementation of a RED profile according to embodiments of the present disclosure.

DETAILED DESCRIPTION OF THE PREFERRED EMBODIMENTS

Figure 1:
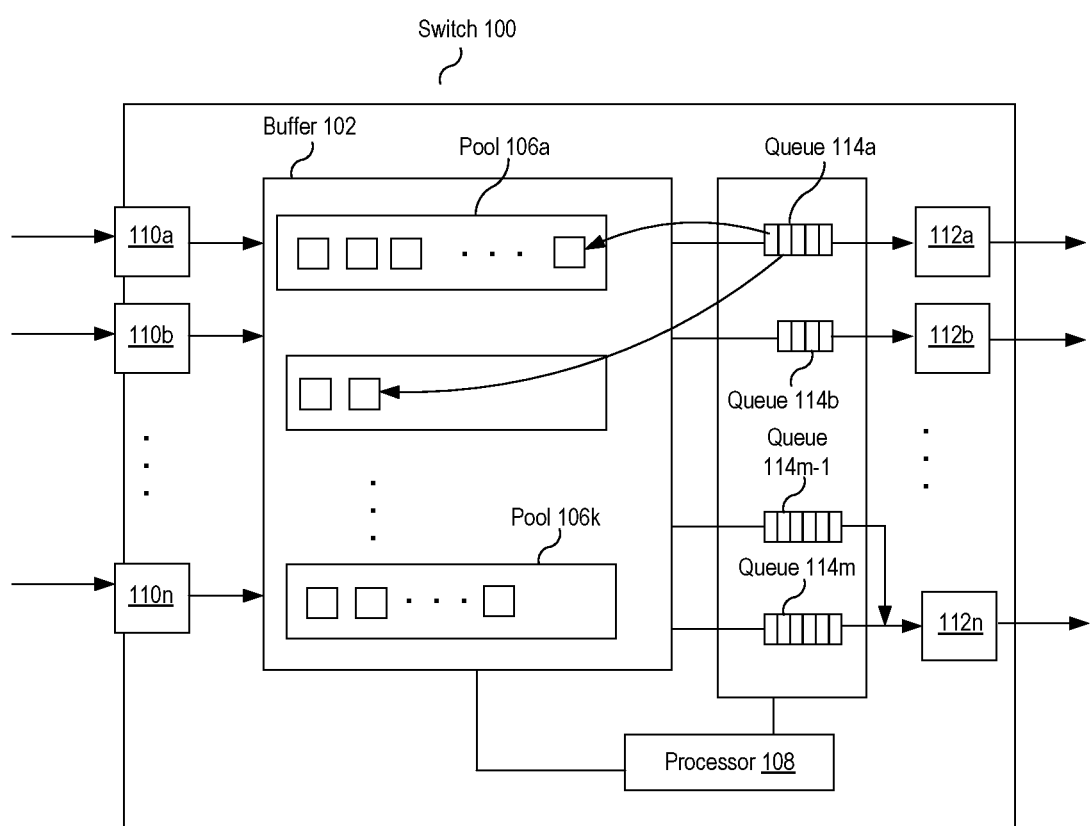
FIG. 1 depicts a schematic diagram of a network switch according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently.

FIG. 1 shows a schematic diagram of a network switch (or shortly switch) 100 according to embodiments of the present invention with the ingress and egress functions separated. As depicted, the switch 100 may include: a processor 108, n number of ingress ports 110a-110n, k number of data pools (shortly pools) 106a-106k, m number of queues 114a-114m, and n number egress ports 112a-112n. It is noted that the switch 100 may include other suitable number of processors. In embodiments, the components in the switch 100 may be implemented in different configurations. In embodiments, the queues 114a-114m may share the storage space in the buffer 102.

In embodiments, each of the data packets received through the ports 110a-110n may include the information of destination and priority, and, based on this information, the processor 108 may process data packet. In embodiments, upon receiving a data packet through one of the ingress port (e.g. 110a), the processor 108 may store the data packet into the buffer 102, more specifically into one of the pools (e.g. 106a) until the data packet is sent out though one of the egress port (e.g. 112b). In embodiments, each queue (e.g. 114a) may include a sequence of memory addresses, where each memory address may point to the location where the corresponding data packet is stored in the pools 106a-106k, as indicated by the arrows 130a and 130b. Then, the data packets in the queue 114a may be sent out through the egress port 112a according to the sequence in the queue 114a.

In embodiments, the processor 108 may process the data packets using the dynamic threshold technique (or shortly DT). The dynamic threshold technique is used to ensure equitable sharing of the buffer across the queues 114a-114m. For the buffer 102 shared by the multiple queues 114a-114m, the processor 108 may decide whether to admit an arriving data packet to the corresponding queue (e.g. 112a) by checking if the following equation is satisfied:

$$Qlen < alpha*(\text{free space}) \tag{1}$$

where Qlen refers to the current space used by the queue 112a (more specifically, the storage space occupied by the data packets listed in the queue) and free space refers to the remaining storage space in the shared buffer 102. Alpha refers to a variable that may set an upper limit on the portion of buffer space that a queue can use. In embodiment, a queue may be limited to alpha/(1+alpha*N) of the shared buffer space, where N is the number of congested queues. For instance, when alpha is set to 1 and there is one congested queue, the space that each queue can use may be limited to ½ of the shared buffer space. In another example, when alpha is set to 1 and there are two congested queues, each queue may be limited to ⅓ of the shared buffer space. In embodiments, the user may set alpha to any number that is equal to or greater than 1. Hereinafter, the right hand side of the Equation (1), i.e. alpha*(free space), may be referred to as available free space (or shortly FS) of DT. In embodiments, a data packet may be admitted if the Equation (1) is satisfied; otherwise, the data packet may be dropped (discarded) by DT running on the switch 100.

In embodiments, the processor 108 may also discard a data packet using a DT-aware random early detection (or shortly RED-DT) technique and/or mark a data packet using explicit congestion notification (ECN) technique. Unlike the conventional RED, in embodiments, the processor 108 may use RED-DT that has variable parameters so that the probability to discard (or mark) a data packet is changed according to the available free space (FS) of DT. In embodiments, ECN may be used along with RED-DT so that the data packets are marked before DT starts discarding the arriving data packets.

Figure 2A:
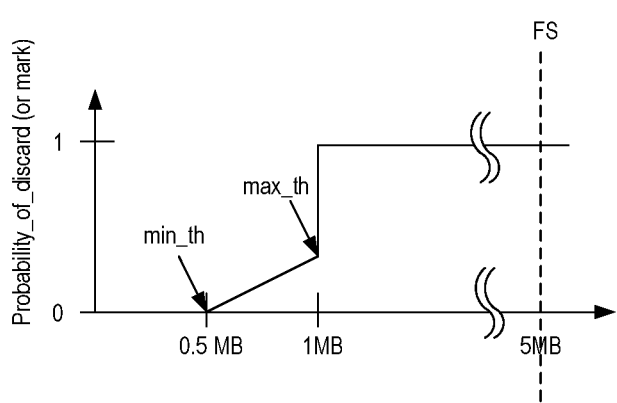
FIGS. 2A and 2B depict exemplary plots of probability to mark a data packet according to embodiments of the present disclosure.

In embodiments, the RED-DT may include the two variable parameters: minimum threshold, min_th, and maximum threshold, max_th. FIG. 2A depicts an exemplary plot of the probability (y-axis) to drop a data packet according to embodiments of the present disclosure. As depicted, RED-DT starts dropping data packets in a random manner when the space used by a queue (or shorty queue length) reaches the min_th (e.g. 0.5 MB). The probability that a data packet is randomly dropped by RED-DT may increase to 0.3 as the queue length increases to the max_th (e.g. 1 MB). When the queue length is beyond 1 MB, all of the arriving data packets may be dropped by RED-DT.

Figure 2B:
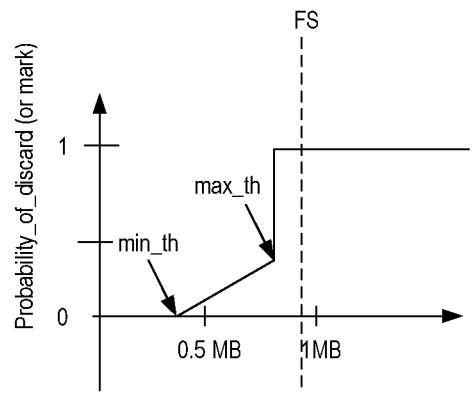

As depicted in FIG. 2A, the available free space (FS) of DT may be set to 5 MB, i.e., DT starts discarding the data packets when the queue length reaches 5 MB. As such, in FIG. 2A, RED-DT can always take effect before DT starts discarding the data packet. Stated differently, FIG. 2A describes a case where the RED-DT variables are not affected by DT. However, if FS for a queue becomes less than 1 MB due to congestion in one or more of the queues 114a-114m, DT may discard all of the arriving data packets before RED-DT can take effect unless the variables min_th and max_th of RED-DT are adjusted. FIG. 2B depicts an exemplary plot of the probability (y-axis) to discard (drop) a data packet according to embodiments of the present disclosure. As shown in FIG. 2B, FS of DT may be less than 1 MB (say to 0.8 MB) during operation. In such a case, the profile of the RED-DT may be adjusted so that RED-DT can take effect before DT starts discarding all of the arriving data packets.

In embodiments, when the max_th of RED-DT is greater than the FS of DT, the processor 108 may calculate a ratio R, where R is min_th/max_th. Then, to adjust the profile (i.e., parameters) of RED-DT, the max_th may be set to y*FS and the min_th may be set to max_th*R. In embodiments, the variable y, which is referred to as allowance factor (AF), may be a number between 0 and 1 and may allow some headroom for RED-DT to operate before DT starts discarding the arriving data packets. Hereinafter, the quantity y*FS is termed as allowable free space (AFS). In FIG. 2B, the allowance factor y is set to 0.8 so that max_th is set to 640 KB (0.8*800 KB) and min_th is set to R*max_th, i.e. 320 KB (0.5*640 KB). As FS decreases to zero, RED-DT may take effect sooner on all queues.

In embodiments, the processor 108 may use a weighted DT-aware random early detection (WRED-DT) technique to process data packets with different color (classification), such as green, red, and yellow. For each color, WRED-DT may include the min_th and max_th that may be changed according to the available free space (FS) of DT. In embodiments, the configuration (i.e., the min_th and max_th) of WRED-DT for one color may be different from the configuration for other color. The approach to adjust the configuration of WRED-DT will be described in conjunction with FIG. 5.

In embodiments, the processor 108 may use an explicit congestion notification (ECN) technique in conjunction with RED-DT (or WRED-DT) so that the packet sender is notified of a potential congestion before the queue gets full. In embodiments, the data communication session between the packet sender and the switch 100 may be ECN-capable so that data packets are marked as ECN capable transport (ECT). In embodiments, a data packet may include ECN bits in the IP header, where the ECN bits are used to signal congestion by marking congestion experienced (CE) in the ECN bits before a queue gets full. In embodiments, if RED-DT (or WRED-DT) determines that a queue is deemed congested and if the communication session is ECN-capable, ECN bits of the received data packet may be marked to indicate CE. If the communication session is not ECN-capable, RED-DT (or WRED-DT) may drop the data packet without marking the data packet.

In embodiments, ECN may be used in conjunction with RED-DT (or WRED-DT). As such, the probability for marking a data packet by ECN may have the same configuration as the probabilities shown in FIGS. 2A and 2B. Stated differently, the x-axes of FIGS. 2A and 2B may represent the lengths of a queue and the y-axes may represent the probability that an ECT data packet is marked by RED. In embodiments, the max_th of RED is adjusted so that the max_th is always equal to or less than the allowable free space (AFS). This adjustment may allow a newly congested queue to mark received data packets until the congestion settles. In embodiments, ECN may be applied to mark-on-enqueue implementations, where the mark-from-front strategy is preferred since ECN feedback may be more timely.

In embodiments, ECN may be used by various protocols, such as data center transmission control protocol (DC-TCP). In embodiments, the protocol may require a single fixed threshold at which the data packets are marked. In such a case, the min_th of RED-DT may be set to max_th of RED-DT.

In conventional systems, RED has a fixed configuration, i.e., min_th and max_th have fixed values. As such, if max_th is set too low, ECN may start marking data packets even when the queues are not congested. Also, if the max_th is set too high, DT starts dropping data packets before ECN marks the data packets. Unlike the conventional systems, in embodiments, RED-DT (more specifically, min_th and max_th) may be configured according to the available free space (FS) of DT so that the data packets are marked when the queues are congested, but before DT starts dropping the data packets.

Figure 3:
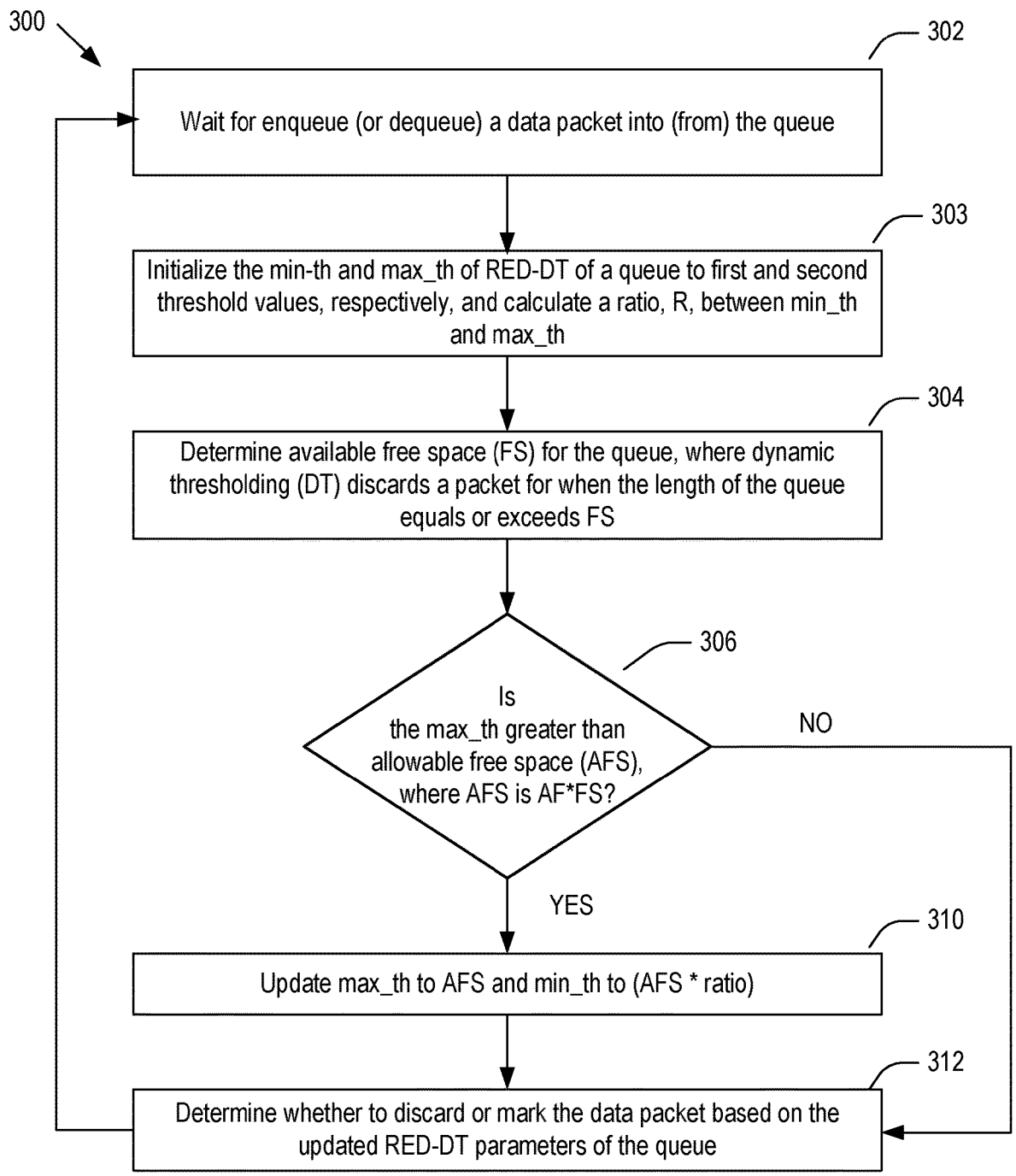
FIG. 3 depicts a flowchart of an illustrative process for adjusting a RED profile according to embodiments of the present disclosure.

FIG. 3 depicts a flowchart 300 of an illustrative process for adjusting a RED-DT profile according to embodiments of the present disclosure. The process starts at step 302. At step 302, a data packet may be enqueued into (or dequeued from) the queue 114b. In one or more embodiments, this algorithm is run at packet enqueue for non-ECT packets, or when ECN is disabled, while it is run at packet dequeue when ECN is enabled and the packet is ECT. Next, at step 303, the min_th and max_th of a RED-DT of a queue (e.g. 114b) may be set to first and second threshold values (say 500 KB and 1 MB, as shown in FIG. 2A), respectively. In an embodiment, these values may be provided by user configuration. Also, the ratio R between the min_th and max_th may be calculated. Then, at step 304, the processor 108 may determine the available free space (FS) of DT for the queue, where a data packet is discarded by DT when the length of the single queue reaches (i.e., equals or exceeds) FS. At step 306, it may be determined whether max_th is greater than allowable free space (AFS), where AFS is a multiplication of the allowance factor (AF), y, by the available free space (FS) and y is a parameter between 0 and 1. If the answer to the decision diamond 306 is positive, the process proceeds to step 310.

At step 310, the max_th is set (updated) to AFS and the min_th may be set (updated) to R*AFS so that the ratio between the min_th and max_th remains unchanged. Then, at step 312, the processor 108 may determine whether to discard (or mark) the data packet based on the updated RED-DT parameters. Also, in embodiments, FIGS. 2A and 2B may be used to assign a probability to drop (or mark) the data packet to the queue, based on the updated RED-DT parameters. Then, the process proceeds to step 303. If the answer to the decision diamond 306 is negative, the process proceeds to a decision diamond 312.

FIG. 4 depicts tables that correspond to an implementation of a RED-DT profile according to embodiments of the present disclosure. In embodiments, Tables 1-10 in FIG. 4 may be pre-computed and used to determine a probability that a data packet is discarded by RED-DT (or a data packet is marked using ECN). As depicted, each table may correspond to a value of the max_th of RED-DT, where each table may include the queue length (qlen) that is discretized into multiple steps and the probability to discard a data packet for each step. For instance, when the max_th of RED-DT is 0.8 MB and a queue length is 640 KB, the probability that RED-DT may randomly discard (or mark using ECN) a data packet is 0.18. In one example, the row selected is the one closest in value to, but less than or equal to the current queue length. In another example, when the queue length falls between two neighboring rows in a table, the interpolation technique may be used.

In one or more embodiments, the implementation in FIG. 4 may be augmented in two ways. In the first approach, the probability for the current pair of max_th and queue length may be determined using the tables in FIG. 4. As the first step, Tables 1-10 may be ordered in an increasing order of max_th, as shown in FIG. 4. Next, the processor 108 may select a first one table among a set of tables in FIG. 4, where the computed max_th is less than or equal to the max_th value of the table. Then, the processor 108 may select a first row among a set of rows in the selected table, where the current queue length is less than or equal to the queue lengths of the selected set of rows. By way of example, when the computed max_th is 0.75 MB and the queue length is 630 KB, Table 8 may be selected since the computed max_th (0.75 MB) is greater than the max_th values of Tables 1-7 and Table 8 is the first table where the computed max_th value is less than the table's max_th. Then, in Table 8, the row (640 KB, 0.18) may be selected since the row (640 KB, 0.18) is the first row of which the queue length (640 KB) is greater than or equal to the current queue length (630 KB). Thus, the probability to discard a data packet (or mark it using ECN) is 0.18.

In embodiments, in the second approach to determine the probability, a multiplication factor and one of Tables 1-10 (e.g., Table 10) in FIG. 4 may be used. In this approach, the multiplication factor m, which is the ratio of the allowable free space (y*FS) to the current max_th of the queue, may be calculated. Then, in Table 10 in FIG. 4, pick a first row that satisfies the relation:

$$glen<=(m*glen \text{ in table}) \quad (2)$$

For instance, when the allowable free space, max_th and length of a queue is 0.95 MB, 1 MB, and 610 KB, respectively, the multiplication factor is 0.95. Then, in Table 10 in FIG. 4, the first row that satisfies equation (2) is (650 KB, 0.09). Thus, the probability assigned to the queue may be 0.09.

It is noted that Tables 1-10 in FIG. 4 may be used as an implementation of an ECN profile according to embodiments of the present disclosure. In embodiments, the probability that a data packet is marked by ECN for a given pair of max_th and queue length may be calculated using the two approaches discussed above.

Figure 5:
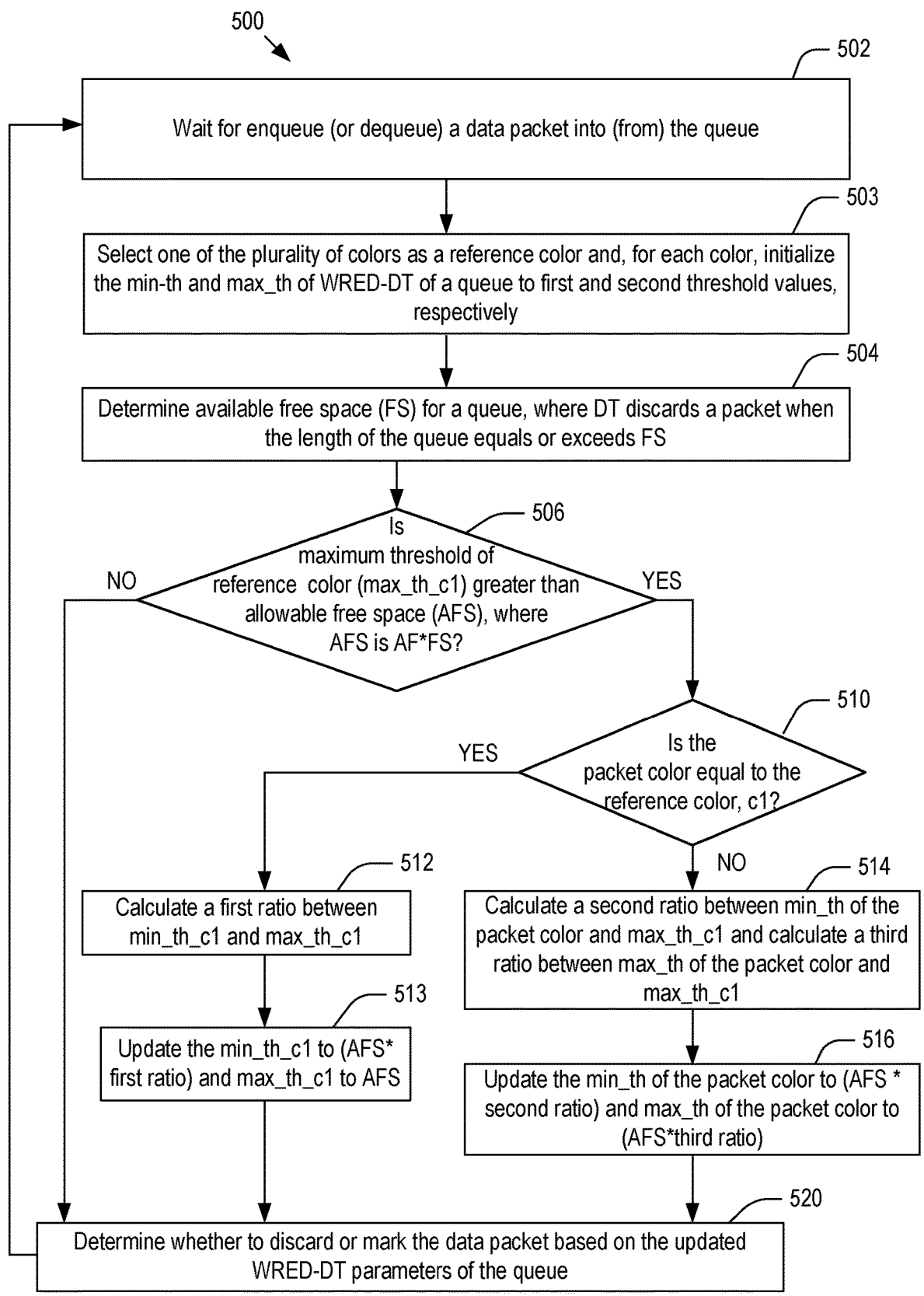
FIG. 5 depicts a flowchart of an illustrative process for adjusting a weighted random early detection (WRED) profile according to embodiments of the present disclosure.

In embodiments, WRED-DT technique may be used along with ECN so that preferential drop (and marking) probabilities are assigned to data packets that are colored (classified) according to differentiated services code point (DSCP) values. FIG. 5 depicts a flowchart 500 of an illustrative process for adjusting WRED-DT profile according to embodiments of the present disclosure. The process starts at step 502.

At step 502, a data packet having a color may be enqueued into (or dequeued from) the queue 114a. In one or more embodiments, this algorithm is run at packet enqueue for non-ECT packets, or when ECN is disabled, while it is run at packet dequeue when ECN is enabled and the packet is ECT. At step 503, one of a plurality of colors may be selected as a reference color, c1, and, for each color, the minimum threshold (min_th) and maximum threshold (max_th) of a queue (e.g. 114a) may be set to first and second threshold values, respectively. In one embodiment, the reference color may be the one with the maximum value of max_th.

Then, at step 504, the processor 108 may determine the available free space (FS) of DT for the corresponding queue, where a data packet is discarded by DT when the length of the queue reaches (equals or exceeds) FS. At step 506, it may be determined whether maximum threshold of the reference color, max_th_c1, is greater than allowable free space (AFS), where AFS is a multiplication of the allowance factor (AF), y, by the available free space (FS) and y is a parameter between 0 and 1. If the answer to the decision diamond 506 is negative, the process proceeds to step 520.

At the decision diamond 510, it may be determined whether the packet color is equal to the reference color, c1. If the answer to the decision diamond 510 is positive, the process proceeds to step 512. At step 512, the processor 108 may calculate a first ratio of min_th_c1 to max_th_c1. Then, at step 513, the min_th_c1 may be set (updated) to (AFS*first ratio) and the max_th_c1 may be set (updated) to AFS. Then, the process proceeds to step 520. At step 520, the processor 108 may determine whether to discard (or mark) the data packet, based on the updated WRED-DT parameters. Also, in embodiments, FIGS. 2A and 2B may be used to assign a probability to drop (or mark) the data packet to the queue, based on the updated WRED-DT parameters. Then, the process proceeds to step 502.

If the answer to the decision diamond 510 is negative, the process proceeds to step 514. At step 514, the processor 108 may calculate a second ratio between the minimum threshold, min_th, of the packet color and the max_th_c1 and calculate a third ratio between the maximum threshold, max_th, of the packet color and max_th_c1. Next, at step 516, the min_th of the packet color may be set (updated) to (AFS*second ratio) and the max_th of the packet color may be set (updated) to (AFS*third ratio). Then, the process proceeds to step 520 and subsequently step 502.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
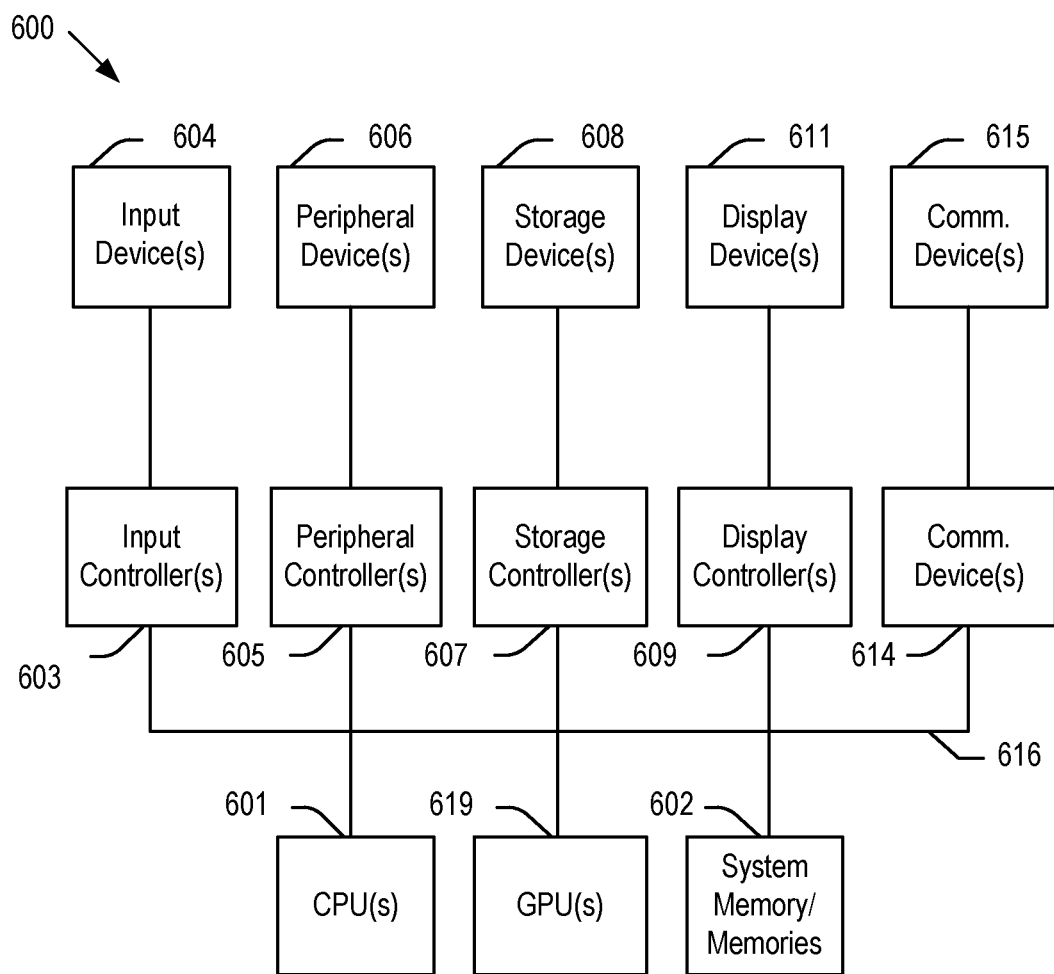
FIG. 6 depicts a simplified block diagram of an information handling system according to embodiments of the present invention.

FIG. 6 depicts a simplified block diagram of an information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT), a thin film transistor (TFT) display, organic light-emitting diode, electroluminescent panel, plasma panel, or other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 7:
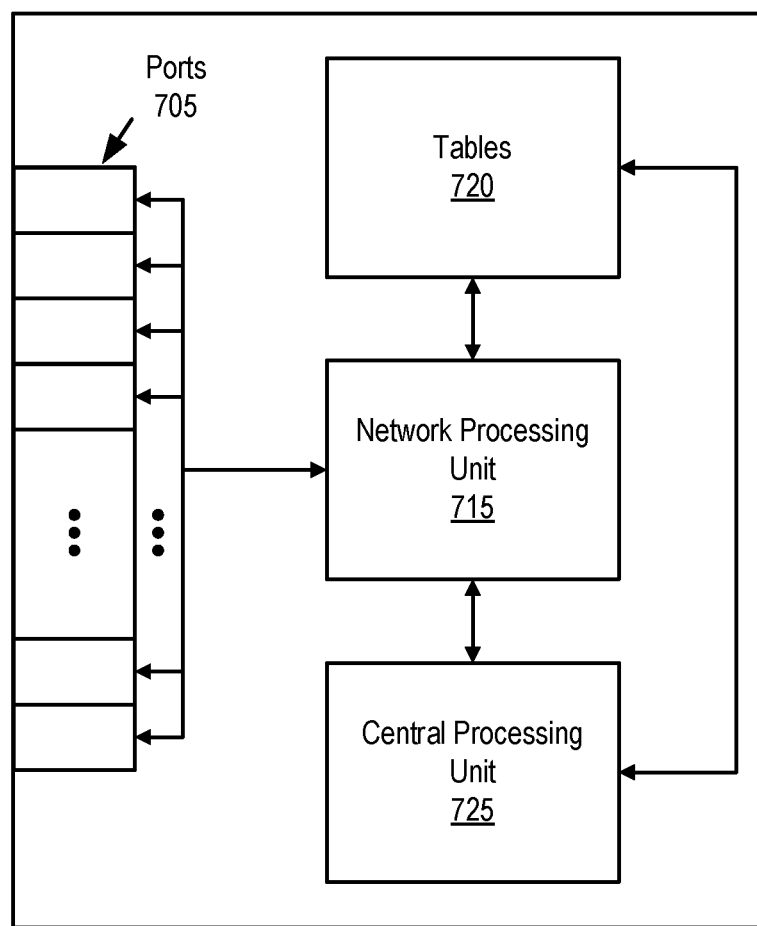
FIG. 7 depicts an alternative block diagram of an information handling system, according to embodiments of the present disclosure.

FIG. 7 depicts an alternative block diagram of an information handling system, according to embodiments of the present disclosure. It will be understood that the functionalities shown for system 700 may operate to support various embodiments of the present disclosure—although it shall be understood that such system may be differently configured and include different components (including fewer or more components).

The information handling system 700 may include a plurality of I/O ports 705, a network processing unit (NPU) 715, one or more tables 720, and a central processing unit (CPU) 725. The system includes a power supply (not shown) and may also include other components, which are not shown for sake of simplicity.

In one or more embodiments, the I/O ports 705 may be connected via one or more cables to one or more other network devices or clients. The network processing unit 715 may use information included in the network data received at the node 700, as well as information stored in the tables 720, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors (or processing units) to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An information handling system, comprising:
a queue for organizing one or more data packets stored in a buffer;
the buffer for storing the one or more data packets;
one or more processors communicatively coupled to the buffer and queue; and
a non-transitory computer-readable medium or media comprising one or more sequences of instructions which, when executed by at least one of the one or more processors, causes steps to be performed comprising:
initializing minimum and maximum thresholds of a random early detection (RED) associated with the queue;
determining an available free space that is available for the queue and located in the buffer, wherein a data packet for the queue is discarded by a dynamic thresholding when a length of the queue reaches the available free space;
determining an allowable free space (AFS) for the queue that is a product of the available free space and an allowance factor (AF); and
responsive to reaching of the length of the queue to the AFS, calculating a ratio of the minimum threshold to the maximum threshold and updating the maximum threshold to the AFS and updating the minimum threshold to a product of the ratio and the AFS.

2. An information handling system as recited in claim 1, wherein the non-transitory computer-readable medium or media further comprises one or more sequences of instructions which, when executed by at least one of the one or more processors, causes steps to be performed comprising:
determining whether to drop the data packet, based on the updated minimum threshold, updated maximum threshold and the length of the queue.

3. An information handling system as recited in claim 2, wherein the step of determining whether to drop the data packet includes:
assigning to the queue a probability to drop the data packet, based on the updated minimum threshold, updated maximum threshold and the length of the queue.

4. An information handling system as recited in claim 2, wherein the non-transitory computer-readable medium or media further comprises one or more sequences of instructions which, when executed by at least one of the one or more processors, causes steps to be performed comprising:
repeating the steps in claims 1 and 2 at each packet enqueue into the queue.

5. An information handling system as recited in claim 1, wherein the non-transitory computer-readable medium or media further comprises one or more sequences of instructions which, when executed by at least one of the one or more processors, causes steps to be performed comprising:
determining whether to mark the data packet using an explicit congestion notification (ECN) associated with the RED, based on the updated minimum threshold, updated maximum threshold and the length of the queue.

6. An information handling system as recited in claim 5, wherein the step of determining whether to mark the data packet includes:
assigning to the queue a probability that the data packet is marked using the ECN, based on the updated minimum threshold, updated maximum threshold and the length of the queue.

7. An information handling system as recited in claim 5, wherein the non-transitory computer-readable medium or media further comprises one or more sequences of instructions which, when executed by at least one of the one or more processors, causes steps to be performed comprising:
repeating the steps in claims 1 and 5 at each packet dequeue from the queue.

8. An information handling system as recited in claim 1, wherein the allowance factor (AF) is a number between 0 and 1.

9. A computer-implemented method of adjusting configuration of a random early detection (RED), comprising:
initializing minimum and maximum thresholds of a random early detection (RED) associated with a queue;
determining an available free space that is available to the queue and located in a data storage buffer, wherein a data packet for the queue is discarded by a dynamic thresholding when a length of the queue reaches the available free space;
determining an allowable free space (AFS) for the queue that is a product of the available free space and an allowance factor (AF); and
responsive to reaching of the length of the queue to the AFS, calculating a ratio of the minimum threshold to the maximum threshold and updating the maximum threshold to the AFS and updating the minimum threshold to a product of the ratio and the AFS.

10. A computer-implemented method as recited in claim 9, further comprising:
determining whether to drop the data packet, based on the updated minimum threshold, updated maximum threshold and the length of the queue.

11. A computer-implemented method as recited in claim 10, wherein the step of determining whether to drop the data packet includes:
assigning to the queue a probability to drop the data packet, based on the updated minimum threshold, updated maximum threshold and the length of the queue.

12. A computer-implemented method as recited in claim 10, further comprising:
repeating the steps in claims 9 and 10 at each packet enqueue into the queue.

13. A computer-implemented method as recited in claim 9, further comprising:
determining whether to mark the data packet using an explicit congestion notification (ECN) associated with the RED, based on the updated minimum threshold, updated maximum threshold and the length of the queue.

14. A computer-implemented method as recited in claim 13, wherein the step of determining whether to mark the data packet includes:
assigning to the queue a probability that the data packet is marked using the ECN, based on the updated minimum threshold, updated maximum threshold and the length of the queue.

15. A computer-implemented method as recited in claim 13, further comprising:
repeating the steps in claims 9 and 13 at each packet dequeue from the queue.

16. A computer-implemented method as recited in claim 9 wherein the allowance factor (AF) is a number between 0 and 1.

17. An information handling system, comprising:
first and second queues for storing information of one or more data packets of first and second colors, respectively;
a buffer for storing the one or more data packets;
one or more processors communicatively coupled to the buffer and queue; and
a non-transitory computer-readable medium or media comprising one or more sequences of instructions which, when executed by at least one of the one or more processors, causes steps to be performed comprising:
initializing first minimum and maximum thresholds of a weighted random early detection (WRED) associated with the first color;
initializing a second maximum threshold of the WRED associated the second color;
determining an available free space that is available for the first queue and located in the buffer, wherein a data packet for the first queue is discarded by a dynamic thresholding when a length of the first queue reaches the available free space;
determining an allowable free space (AFS) for the first queue that is a product of the available free space and an allowance factor (AF) that is between 0 and 1;
responsive to a length of the second queue that is greater than the AFS, calculating a first ratio of the first minimum threshold to the second maximum threshold and a second ratio of the first maximum threshold to the second maximum threshold; and
updating the first minimum threshold to a product of AFS and the first ratio and updating the first maximum threshold to a product of AFS the second ratio.

18. An information handling system as recited in claim 17, wherein the non-transitory computer-readable medium or media further comprises one or more sequences of instructions which, when executed by at least one of the one or more processors, causes steps to be performed comprising:
determining whether to drop the data packet, based on the updated first minimum threshold, updated first maximum threshold and the length of the first queue.

19. An information handling system as recited in claim 17, wherein the non-transitory computer-readable medium or media further comprises one or more sequences of instructions which, when executed by at least one of the one or more processors, causes steps to be performed comprising:
assigning to the first queue a probability to drop the data packet, based on the updated first minimum threshold, first maximum threshold and the length of the first queue.

20. An information handling system as recited in claim 17, wherein the non-transitory computer-readable medium or media further comprises one or more sequences of instructions which, when executed by at least one of the one or more processors, causes steps to be performed comprising:
determining whether to mark the data packet using an explicit congestion notification (ECN) associated with the WRED, based on the updated first minimum threshold, updated first maximum threshold and the length of the first queue.

* * * * *